UNITED STATES PATENT OFFICE.

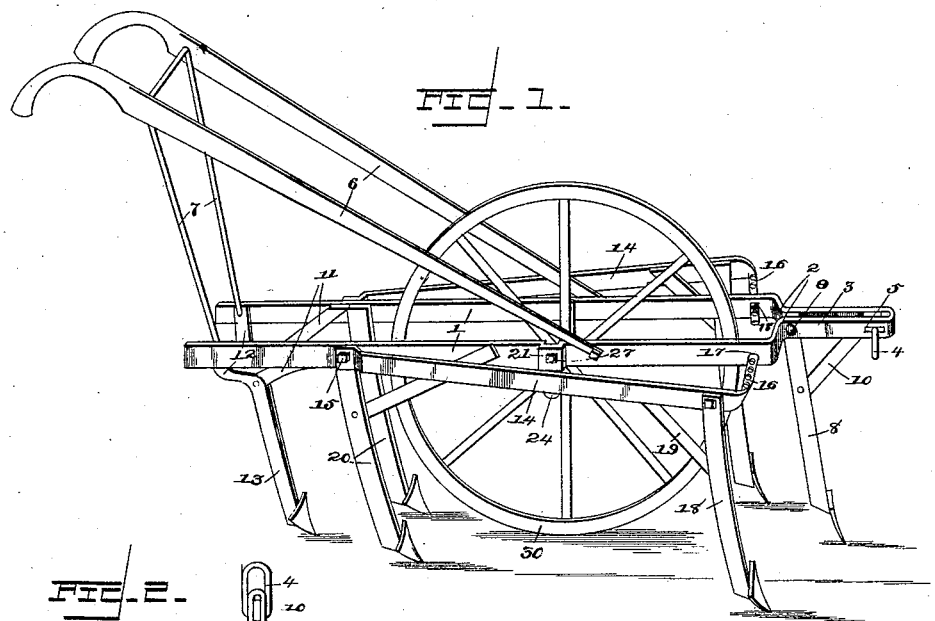

WILLIAM C. DE GRAFFENRIED, OF JASPER, FLORIDA.

CULTIVATOR.

SPECIFICATION forming part of Letters Patent No. 454,036, dated June 16, 1891.

Application filed March 12, 1891. Serial No. 384,818. (No model.)

*To all whom it may concern:*

Be it known that I, WILLIAM C. DE GRAFFENRIED, a citizen of the United States, residing at Jasper, in the county of Hamilton and State of Florida, have invented a new and useful Cultivator, of which the following is a specification.

This invention relates to improvements in cultivators; and the objects in view are to provide a cultivator that will be simple in construction, is capable of being produced at a minimum cost, is light and easy of draft and effective in operation, and readily adjustable.

Other objects and advantages of the invention will appear in the following description, and the novel features thereof will be particularly pointed out in the claims.

Referring to the drawings, Figure 1 is a perspective of a cultivator constructed in accordance with my invention. Fig. 2 is a plan view of the same. Fig. 3 is a detail in perspective of the opposite side bars or portions thereof, the axle, and the axle-supporting standards.

Like numerals of reference indicate like parts in all the figures of the drawings.

In practicing my invention I preferably form the frame-work of light wrought-iron, oblong in cross-section, in which I employ the opposite side bars 1, extended parallel for the major portions of their lengths, and near their front ends inwardly bent toward each other, as at 2, and combining to form a draft-beam 3, in which is formed a slot 5 for the reception of a clevis 4, yieldingly mounted in position. From the opposite side bars rise and rearwardly extend a pair of handles 6, terminating beyond the rear end of the frame-work and supported by braces 7. A plow-standard 8 is bolted, as at 9, between the converged ends of the side bars 1, and is braced by an inclined brace 10, bolted to the beam 3 and to the said standard. Opposite pairs of front and rear braces 11 and 12 respectively are secured to the rear ends of the side bars 1, converge, meet, and merge into a standard 13, also carrying a cultivator-point.

14 designates a wing, of which there are a pair, each being bolted loosely at its rear end, as at 15, to a side bar, said wings diverging laterally from the side bars, and near the ends thereof inwardly bent and perforated to form adjusting-bars 16, which pass through openings 17, formed in said side bars, in which they are adjustable by pins 18. By means of the pins the wings may be adjusted inwardly or outwardly, and with them carry a pair of perforated standards 18, located at the front corners of the wings, braced as at 19 and provided with cultivator points or shovels. A similar standard 20 is located at the rear end of each of the wings and bolted to the side bars 1. Near their middles the side bars have offsets 21, in which are located hangers 23, terminating at their lower ends in bearings 24, and above the same having adjusting-perforations 25, any one of which may be thrown into register with a perforation 26, formed in each of the offsets 21, and there connected in adjustable manner by a bolt 27.

In the bearings 24 are mounted the reduced cylindrical ends 28 of a square axle 29, carrying a single ground-wheel 30, which may be raised and lowered by manipulating the hangers, in which manner the points of the shovels may be raised and lowered from the ground, as will be apparent, and may be adjusted laterally to the furrow by the screw 31.

It will be observed that the outer shovels may be adjusted, and that the depths of penetration of the entire series regulated; that the entire structure is light, strongly braced, and durable, and will be effective in operation.

By adjusting the wheel 30 by means of the set-screw in hub the position of the wheel upon square axle 29 may be regulated, throwing it nearer to or farther from either of the side bars, as the case may be.

Having described my invention, what I claim is—

1. The combination, with the opposite beams 1, converged at their front ends to form the draft-beam 3, having a clevis, and an interposed depending cultivator-standard 8, the rear pairs of braces 11 and 12, the handles and their braces, of the wings 14, connected at their rear ends to the beams 1, diverged from the same and terminating in inwardly-disposed perforated adjusting-bars 16, passing through the openings in the beams 1, the adjusting-pins for the same, the cultivator-standards located at the front ends of the wings, the similar standards located at the rear ends of the same, the offsets formed in the beams 1, the depending perforated standards 25, the adjusting-pins for the same, the bearings at the lower ends of the standards, the axle, and the ground-wheel adjustably mounted on the axle, substantially as specified.

2. In a cultivator, the combination, with the main frame and its ground-wheel, of cultivator-standards connected to the main frame, opposite wings connected to the sides of the frame near the rear ends thereof and provided at their front ends with inwardly-disposed perforated adjusting-bars, adjusting-pins for the bars, and plow-standards depending from the wings, substantially as specified.

3. In a cultivator, the combination, with the main frame and the standards, said frame being provided with perforated offsets, of perforated standards mounted in the offsets and terminating at their lower ends in bearings, the axle mounted in the bearings, the laterally-adjustable ground-wheel upon the axle, and the adjusting-pins for the standard, substantially as specified.

In testimony that I claim the foregoing as my own I have hereto affixed my signature in presence of two witnesses.

WILLIAM C. DE GRAFFENRIED.

Witnesses:
A. B. SMALL,
D. B. TURNER.